United States Patent Office 3,147,125
Patented Sept. 1, 1964

3,147,125
GELATIN FOOD PRODUCT
Nicholas D. Pintauro, New City, N.Y., James M. Reynolds, Franklin Park, N.J., and Kenneth R. Newman, New City, N.Y., assignors to General Foods Corporation, White Plains, N.Y., a corporation of Delaware
No Drawing. Filed July 20, 1962, Ser. No. 211,406
5 Claims. (Cl. 99—130)

This invention relates to a gelatin jelly composition of the type commonly used in desserts, salads and the like.

Gelatin dessert preparations generally comprise certain edible food acids such as citric acid, flavor and color, as well as sugar, although in some products, such as gelatin jellies and the like, the sugar may be substantially reduced or even eliminated. It is preferred that such gelatin food products have a tart taste provided by the above-named food acid. This results in lowering the pH of the gelatin solution for the dessert products.

Gelatins of various types have an isoelectric point (I.E.P.) generally above the preferred pH range for such gelatin desserts. For example, acid-processed pig gelatin may have its I.E.P. at pH 6.3 whereas limed gelatin derived from calf or ossein may have an I.E.P. at pH 5. It is well recognized in the art that any one of the physical properties of these gelatin desserts can be improved by increasing the pH of the gelatin solution so as to approach the isoelectric point of the gelatin. An increased pH for the gelatin solution generally results in an increased rate of set as well as an increased bloom or gel strength for equal quantities of gelatin. However, as pH is increased, there is a corresponding reduction in the tartness experienced in the food product. In the past, it has been difficult to fully reconcile the need for proper tartness level as well as the desirability of increased gel strength and improved setting rate by increasing the pH of the gel.

In British Patent 361,138, issued November 19, 1931, and entitled "Improvements in or Relating to Gelatine Food Preparations," a number of solutions to this problem are posed. Two distinct possibilities are presented to give improvements in gel strength and setting rate. These involve the addition of neutral salts, such as sodium chloride, or buffer salts, such as sodium citrate, to the gelatin mixture. As taught on page 2, column 1, lines 12 to 46 of this British patent, the action of these salts may differ, and in all instances the result is an improvement in the setting time, as well as the melting point and permanence of the finished gel. In the case of a neutral salt, this improvement was not indicated as being due to any particular phenomenon. When a buffer salt was used, it either depressed or held constant the hydrogen ion concentration without adversely affecting tartness of the product.

While these teachings did represent an advance in the art, they did not foresee any advantage in nor did they suggest utilizing a combination of both neutral and buffer salts, particularly at any specific pH range. Further, the British patent did not find important the use of specific quantities of buffer or neutral salts, merely stating that "the proportion of any of the buffer salts, as well as the proportion of the phosphate mixture above described, may vary within considerable limits to suit different palates and to meet different conditions." It has now been discovered that there are definite advantages to be obtained in utilizing in combination with gelatin both neutral and buffer salts together and in quantities which, while insufficient to impart an undesirable taste to the gelatin jelly, nevertheless are effective in modifying the ionic charges on individual gelatin molecules. It is believed that the neutralization or changing of the charges on the gelatin molecules tends to make the gelatin molecules coalesce. The hydration and physical properties of the gelatin are also changed. Also, it is possible that the cross-linking between the gelatin molecules may be altered. In any event, modification of the ionic charges on the gelatin molecules is highly desirable and is accomplished by the use of buffer and neutral salts in substantial quantities.

In accordance with the present invention, a combination of one or more buffer salts and one or more neutral salts is employed, it being found that the use of these two salts together achieves fuller realization of gel improvement than the action of the salts separately. Significantly, this finding that the neutral salts and buffer salts act in combination in gelatin jelly dessert compositions is most apparent where the gelatin solution has a pH in the range of 3.2 to 3.6; at pH's above 3.6, addition of neutral salts to buffer salts does not appear to offer as important a contribution toward enhancing the gelling properties of the solution; at pH's below 3.2, the hydrogen ion concentration is not optimum for deriving these benefits.

In addition to the use of buffer salts to adjust the pH of the composition, the use of both neutral and buffer salts permits a higher total concentration of ions in a subsequently formed gelatin solution than if either were used alone, due to the taste level which is soon reached if, e.g., sodium chloride alone is used, as suggested in the British patent. It is the use of relatively large quantities of both neutral and buffer salts that results in the double result of high ionic content and desired pH of a gelatin solution, the salts in combination effecting achievement of the properties desired in a gelatin solution while permitting a reduction in the amount of gelatin used. In fact, in order to obtain an increased ionic content, it is a feature of our invention that a low pH buffer salt, such as monosodium phosphate, be utilized; such a salt must be present in larger amounts in order to regulate the pH than more efficient buffers such as trisodium phosphate. The relatively inefficient buffer salt being present in greater quantities puts more ions into the gelatin solution while maintaining the pH thereof at the same level as a more efficient buffer salt, and thereby is more effective in modifying the so-called ionic sphere about the gelatin molecules.

With regard to the quantities of neutral and buffer salts utilized, the level of neutral salt should be as much as possible without adversely affecting the taste of the resulting gel. In general, where the neutral salt is sodium chloride, a range of use is about 2.0 to 9.5 percent by weight of gelatin, with a range of about 3.0 to 4.0 percent being preferred. The amount of buffer salt used is such as to bring pH of the resulting solution to a range of about 3.2 to 3.6. This amount will, of course, depend upon the particular buffer salt used. When the buffer salts used are about 1:1 to 4:1 mixtures of monosodium and disodium phosphates, the quantity used will vary from about 11 to 25 percent by weight of gelatin.

When a more effective buffer salt, such as sodium tartrate is used, a concentration of about 8 to 20 percent by weight of gelatin will be found to achieve a desired pH range. While the amount of buffer salts will vary, therefore, a preferred range of about 8 to 25 percent buffer salt by weight of gelatin is preferred, it being understood that the maximum amount of buffer salt is determined to a large degree by pH as well as taste, and the maximum quantity of neutral salt is governed by taste alone. The respective proportions of these neutral and buffer salts will vary in accordance with their identity; however a range of 2:1 to 5:1 buffer salts to neutral salts has been found advantageous.

The invention will be better understood by reference to the following examples.

EXAMPLE I

Table I

| Ingredient: | Level (parts by weight) |
|---|---|
| Gelatin | 11.0 |
| Monosodium phosphate | 2.1 |
| Disodium phosphate | 0.47 |
| Citric acid | 2.83 |
| Sodium chloride | 0.50 |
| Color | 0.38 |
| Flavor | 0.38 |
| Sugar | 82.34 |

85 gms. of a mix containing the above weight of ingredients was dissolved in one pint of hot (not boiling) water, allowed to cool and set at refrigerated temperatures (45–50° F.). The gelatin solution set to a suitable gel strength in 2½ hrs. and at this time provided a Bloom gelometer reading of 28 gms. as determined in accordance with the test procedure outlined in the A.O.A.C. (8th edition, 1959, Method No. 21.2, Jelly Strength Official); after 24 hours the gelatin gel had a strength of 51 gms. The pH of the gelatin solution was 3.3. The melting time, that is the time to soften and sag beyond the point of an acceptable gel when unmolded, was in excess of one hour at 70° F.

In contrast to the above gel character, a conventional gelatin jelly dessert, that is one containing substantially the same formulation as that above, except for the absence of the sodium chloride and the use of buffer sufficient for pH adjustment alone, gives an inferior gel strength. This is illustrated by the following formulation representing a typical gelatin jelly mix of the prior art.

Table II

| Ingredient: | Level (parts by weight) |
|---|---|
| Gelatin | 11.0 |
| Disodium phosphate | 0.78 |
| Citric acid | 2.83 |
| Color | 0.38 |
| Flavor | 0.38 |
| Sugar | 84.63 |

A gelatin gel prepared from the above formulation using the same procedure as that used for the ingredients in Table I results in a gel strength of only 22 gms. (Bloom gelometer) after 2½ hrs. when refrigerated at the same temperatures and 45 gms. (Bloom gelometer) after 24 hours.

Further, the melting time of the formulation of Table II was significantly less than that of the product resulting from use of the formulation of Table I.

EXAMPLE II

The superiority of a neutral salt in combination with an equal level of a buffer salt mixture is further illustrated by the accompanying Table III wherein are tabulated Bloom gelometer readings at different set and melt times. Gels were prepared in each instance in accordance with the procedure of Example I.

Table III

| Ingredients | A | B | C | D | E | F |
|---|---|---|---|---|---|---|
| Gelatin | 9.36 | 9.36 | 9.36 | 9.36 | 9.36 | 9.36 |
| Buffer salt mixture (50% monosodium phosphate and 50% disodium) | | 0.42 | | 0.42 | | 0.42 |
| Salt (sodium chloride) | | | 0.42 | 0.42 | 0.84 | 0.84 |
| Citric acid | 2.02 | 2.40 | 2.02 | 2.40 | 2.02 | 2.40 |
| Color | 0.32 | 0.32 | 0.32 | 0.32 | 0.32 | 0.32 |
| Flavor | 0.32 | 0.32 | 0.32 | 0.32 | 0.32 | 0.32 |
| Sugar | 72.00 | 72.00 | 72.00 | 72.00 | 72.00 | 72.00 |
| pH | 3.3 | 3.3 | 3.3 | 3.3 | 3.3 | 3.3 |
| Set rate: | | | | | | |
| 2½ hrs. gel strength | 18.4 | 22.6 | 23.6 | 24.4 | 26.8 | 27.8 |
| 4 hrs. gel strength | 23.5 | 27.5 | 29.1 | 30.6 | 31.6 | 33.1 |
| 6 hrs. gel strength | 27.2 | 31.1 | 31.1 | 31.5 | 35.2 | 35.0 |
| 17 hrs. gel strength | 39.0 | 43.5 | 44.3 | 46.3 | 46.5 | 49.1 |
| 24 hrs. gel strength | 41.3 | 45.7 | 46.9 | 47.9 | 48.9 | 51.4 |
| Melt rate—After 24 hrs. at 50° F. set: | | | | | | |
| 0 hr. melt at 70° F. | 41.3 | 45.7 | 46.9 | 47.9 | 48.9 | 51.4 |
| ½ hr. melt at 70° F. | 26.5 | 22.9 | 25.7 | 31.6 | 27.6 | 28.4 |

As seen from Talbe III, the same level of gelatin in a mix formulation produced a higher gel strength when employing a buffer salt mixture than when not employing such a mixture (comparing columns A and B). It will be noted comparing columns B and D, that when neutral salt is added to the formulation in column B, a substantial increase in the set rate and gel strength results, which increase is further manifested in the comparison of column F with column B, where a still higher level of neutral salt was employed. Likewise, the melt rates of formulations containing both the neutral salt and the buffer salt was substantially increased over a formulation employing the buffer salt mixture solely. Also it will be noted that the set rates and the melt rates of products containing both a buffer salt mixture and a neutral salt were higher than those containing the neutral salt in the absence of buffer salt.

EXAMPLE III

A gelatin jelly mixture was prepared using the formulation of Table II in Example I, except that 0.71 gm. of sodium sulfate was used as a neutral salt and 0.97 gm. sodium tartrate was substituted for the di-sodium phosphate. A gel was prepared in accordance with the procedure of Example I and Bloom gelometer readings were made in accordance with the standard A.O.A.C. procedure. The set rates and melting times of the gel in Example III were substantially the same as Example I.

EXAMPLE IV

A mix formulation substantially the same as that of Table I in Example I was prepared, except that the gelatin level therein was reduced to about 10.5 gms. The setting rates and melt times of the gelatin gel produced from this formulation is substantially the same as that resulting from the formulation of Table II in Example I, indicating that the sodium chloride in combination with the buffer salt mixture resulted in a saving of approximately 5% by weight of the gelatin in the mix.

While the foregoing invention has been illustrated by a number of specific examples and described with reference to those examples, it will be apparent that the scope of the invention is not to be limited thereto. It is desired that all alterations and modifications in the foregoing description which would be obvious to one skilled in this art be deemed included within the present invention, the scope of which is to be limited only by the following, appended claims.

What is claimed is:

1. A gelatin food product for use in preparing an aqueous jelly, comprising gelatin, an edible buffer salt in an amount sufficient to adjust the pH of the subsequently prepared jelly to about 3.2 to 3.6, and a neutral salt in an amount insufficient to adversely affect the taste of the jelly but sufficient to substantially increase the ionic content thereof, said neutral salt being present in about 2.0 to 9.5 percent by weight of said gelatin, the total quantity of ions added to said food product by said neutral salt and said buffer salt being sufficient to modify ionic charges on individual gelatin molecules and thereby effect an increase in gel strength and melting time of an aqueous jelly formed from said food product.

2. A gelatin food product as claimed in claim 1, in which the amount of buffer salt is 8 to 25 percent by weight of the gelatin.

3. An aqueous gelatin jelly prepared from the gelatin food product claimed in claim 1.

4. A gelatin food product for use in preparing an aqueous jelly, comprising gelatin, an edible buffer salt in an amount sufficient to adjust the pH of the subsequently prepared jelly to about 3.2 to 3.6, and a neutral salt in an amount insufficient to adversely affect the taste of the jelly but sufficient to substantially increase the ionic content thereof, the ratio of buffer salt to neutral salt being about 2:1 to 5:1, the total quantity of ions added to said food product by said neutral salt and said buffer salt being sufficient to modify ionic charges on individual gelatin molecules and thereby effect an increase in gel strength and melting time in an aqueous jelly formed from said food product.

5. A gelatin food product for use in preparing an aqueous jelly, comprising gelatin, an edible buffer salt in an amount sufficient to adjust the pH of the subsequently prepared jelly to about 3.2 to 3.6, said buffer salt consisting of a mixture of monosodium phosphate and disodium phosphate in a ratio of about 4:1, and a neutral salt in an amount insufficient to adversely affect the taste of the jelly but sufficient to substantially increase the ionic content thereof, said neutral salt being present in about 2.0 to 9.5 percent by weight of the gelatin, the total quantity of ions added to said food product by said neutral salt and said buffer salt being sufficient to modify ionic charges on individual gelatin molecules and thereby effect an increase in gel strength and melting time in an aqueous jelly formed from said food product.

References Cited in the file of this patent

FOREIGN PATENTS 361,138    Great Britain _____ Nov. 19, 1931